(12) United States Patent
McMahon, III

(10) Patent No.: US 10,281,082 B2
(45) Date of Patent: May 7, 2019

(54) FACILITATING TRANSFER OF CONTENTS

(71) Applicant: Vallie Hayden McMahon, III, Charlotte, NC (US)

(72) Inventor: Vallie Hayden McMahon, III, Charlotte, NC (US)

(*) Notice: Subject to any disclaimer, the term of this patent is extended or adjusted under 35 U.S.C. 154(b) by 48 days.

(21) Appl. No.: 14/454,272

(22) Filed: Aug. 7, 2014

(65) Prior Publication Data
US 2016/0039569 A1    Feb. 11, 2016

(51) Int. Cl.
*B67C 9/00* (2006.01)
*B67D 3/00* (2006.01)
*B65D 25/20* (2006.01)
*F16M 13/02* (2006.01)

(52) U.S. Cl.
CPC ............. *F16M 13/02* (2013.01); *B65D 25/20* (2013.01); *B67C 9/00* (2013.01); *B67D 3/0051* (2013.01); *B65D 2231/005* (2013.01)

(58) Field of Classification Search
CPC ............ B67C 9/00; B67D 3/0051; B67B 3/06
USPC .................. 220/700; 141/363–366, 319, 86; 248/311.2, 311.3, 312.1
See application file for complete search history.

(56) References Cited

U.S. PATENT DOCUMENTS

| | | | | |
|---|---|---|---|---|
| 496,537 | A * | 5/1893 | Purrington | 141/364 |
| 2,320,262 | A * | 5/1943 | Campbell | 220/696 |
| 2,807,290 | A * | 9/1957 | Hearn | 141/375 |
| 2014/0246123 | A1* | 9/2014 | Cummins | 141/364 |

* cited by examiner

*Primary Examiner* — Jeffrey R Allen
*Assistant Examiner* — Jennifer Castriotta
(74) *Attorney, Agent, or Firm* — Tillman Wright, PLLC; Jeremy C. Doerre; Chad D. Tillman

(57) ABSTRACT

An apparatus is configured to be mounted on a first repository, such as a five gallon bucket, and further configured to allow a second repository, such as another five gallon bucket, to be mounted on the apparatus such that it is supported at an inclined angle which allows contents of the second repository, which may be a viscous material such as honey, to empty into the first repository.

14 Claims, 8 Drawing Sheets

FACILITATING TRANSFER OF CONTENTS

INCORPORATION BY REFERENCE

The present application hereby incorporates herein by reference the entire disclosure of Appendix A hereto.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to facilitating the transfer of contents from one repository, such as a bucket, to another repository, such as another bucket.

Repositories, such as five gallon buckets, are utilized to hold various contents in various endeavors. Some of these contents can have a high viscosity, and the complete transfer of a viscous material from one repository to another can be a prolonged process. For example, in a beekeeping context, transferring honey from one five gallon bucket to another can take a good deal of time.

A need exists for improvement in such transfer. This need and other needs are addressed by one or more aspects of the present invention.

SUMMARY OF THE INVENTION

The present invention includes many aspects and features. Moreover, while many aspects and features relate to, and are described in, the context of buckets, the present invention is not limited to use only in this context, as will become apparent from the following summaries and detailed descriptions of aspects, features, and one or more embodiments of the present invention.

Accordingly, one aspect of the present invention relates to a system comprising a first repository; a second repository; and an apparatus. The apparatus includes first and second side pieces mounted to the first repository, each side piece comprising a mounting slot within which a sidewall of the repository is disposed, an upper surface of the mounting slot supporting the respective side piece on a rim of the repository with walls of the respective piece engaging the sidewall of the repository and stabilizing the respective piece, a retention slot within which a rim of a repository is received and retained, the retention slot having a lesser depth than the mounting slot, and a receiving slot. The apparatus further includes a top piece secured to the first and second side pieces, the top piece comprising a first insert portion disposed proximate a first lateral side, the first insert portion being received within the receiving slot of the first side piece, a second insert portion disposed proximate a second lateral side opposite the first lateral side, the second insert portion being received within the receiving slot of the second side piece, and a curved support surface engaging a sidewall of the second repository and supporting the second repository such that it is oriented to allow contents of the second repository to empty into the first repository.

In one or more preferred implementations, the first repository comprises a five gallon bucket.

In one or more preferred implementations, the second repository comprises a five gallon bucket.

In one or more preferred implementations, the second repository contains a viscous material.

In one or more preferred implementations, the second repository contains honey.

In one or more preferred implementations, the first and second side pieces and the top piece comprise molded plastic.

In one or more preferred implementations, the first and second side pieces and the top piece comprise metal.

In one or more preferred implementations, the curved support surface is not curved uniformly along its face.

In one or more preferred implementations, the curved support surface is curved to correspond to a sidewall of the second repository.

In one or more preferred implementations, the top piece is secured to the first and second side pieces via glue or other adhesive.

In one or more preferred implementations, the top piece is removably secured to the first and second side pieces.

In one or more preferred implementations, the top piece is permanently secured to the first and second side pieces.

Another aspect relates to an apparatus comprising first and second side pieces, each side piece comprising a mounting slot sized and dimensioned to mount the respective piece to a repository, a retention slot sized and dimensioned for receipt of a rim of a repository, the retention slot having a lesser depth than the mounting slot, and a receiving slot; a top piece secured to the first and second side pieces, the top piece comprising a first insert portion disposed proximate a first lateral side, the first insert portion being received within the receiving slot of the first side piece, a second insert portion disposed proximate a second lateral side opposite the first lateral side, the second insert portion being received within the receiving slot of the second side piece, and a curved support surface configured to engage a sidewall of a repository.

In one or more preferred implementations, the apparatus comprises molded plastic.

In one or more preferred implementations, the apparatus comprises metal.

In one or more preferred implementations, the top piece is removably secured to the first and second side pieces.

In one or more preferred implementations, the top piece is permanently secured to the first and second side pieces.

Another aspect relates to mounting an apparatus on a first repository by positioning the apparatus such that two opposed mounting slots of the apparatus each receive and retain a sidewall of the first repository, an upper surface of each receiving slot supporting the apparatus on a rim of the repository and walls of each receiving slot engaging the sidewall of the first repository so as to stabilize the apparatus; and mounting a second repository containing contents on the apparatus by positioning the second repository such that a rim of the second repository is received within each of two opposed receiving slots of the apparatus and a sidewall of the second apparatus is supported on a curved support surface of the apparatus, a front wall of each receiving slot and the curved support surface collectively retaining the second repository in an orientation such that the contents of the second repository empty into the first repository.

In one or more preferred implementations, the first and second repositories comprise five gallon buckets.

In one or more preferred implementations, the contents of the second repository that empty into the first repository comprise honey.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
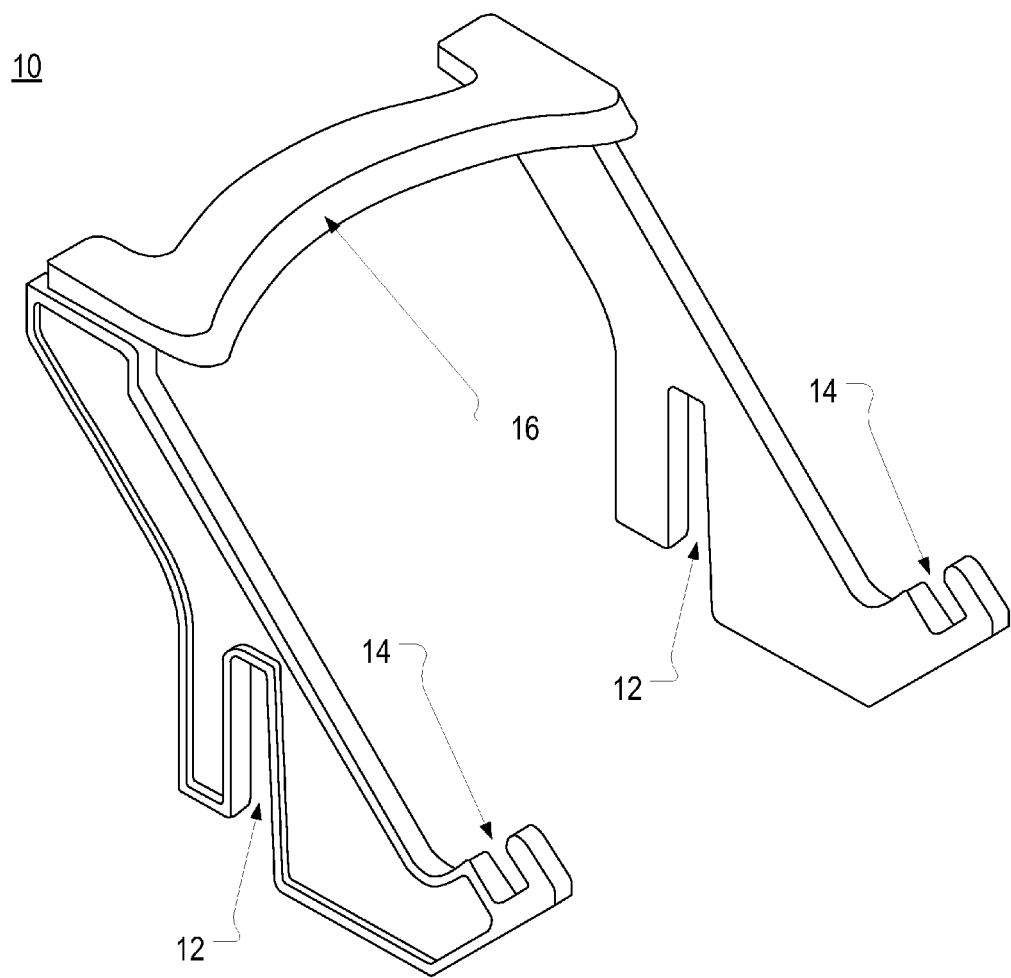
FIG. 1 illustrates an apparatus in accordance with one or more preferred implementations.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 2:
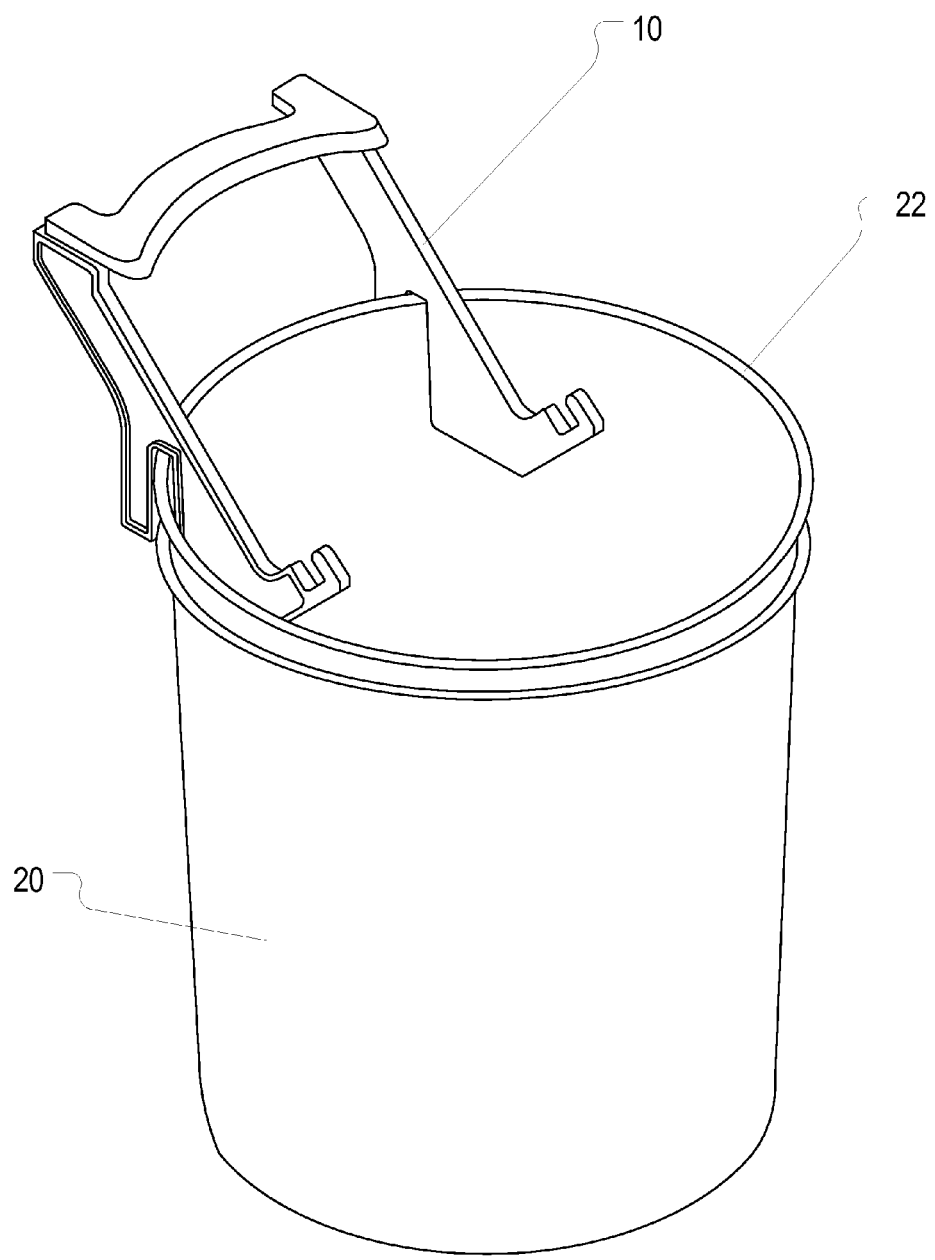
FIG. 2 illustrates the apparatus of FIG. 1 mounted on a repository.

FIG. 1 illustrates an apparatus 10 in accordance with one or more preferred implementations. The apparatus 10 is configured to be mounted on a first repository 20, such as a five gallon bucket, as illustrated in FIG. 2.

The apparatus 10 includes two opposed mounting slots 12 configured to allow the apparatus 10 to be mounted to a repository such that a surface defining a top of each mounting slot 12 abuts a top rim 22 of the repository and supports the apparatus 10. Preferably, inner surfaces defining each mounting slot help to stabilize the apparatus 10 when it is mounted to a repository.

Figure 3:
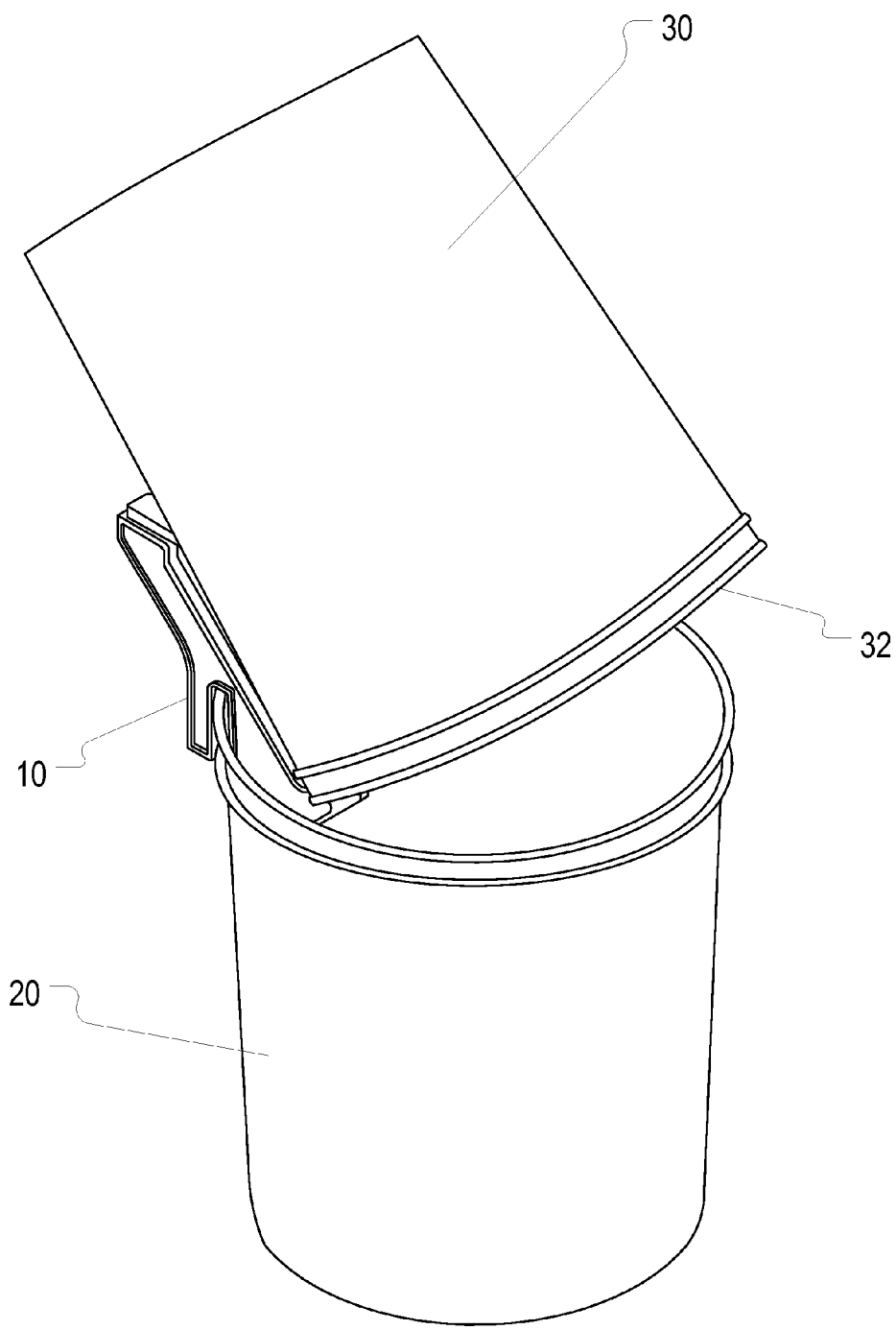
FIG. 3 illustrates another repository mounted on the apparatus of FIG. 1 when it is mounted on a repository.

The apparatus 10 is configured to receive and retain a second repository in a position and orientation such that material disposed in the second repository can travel into the first repository. In particular, the apparatus 10 includes retention slots 14 configured to receive a rim of another repository, and the apparatus further includes a curved support surface 16 configured to support a sidewall of a repository received and retained utilizing the retention slots 14. Preferably, the curved support surface 16 slants generally downward such that a bottom of the curved support surface 16 protrudes farther than a top of the curved support surface 16, as illustrated in FIG. 1. In one or more preferred implementations, the angle of slant varies along the curved support surface 16. In one or more preferred implementations, the angle of slant at any given point along the curved support surface is configured to facilitate engagement with a sidewall of a repository of a certain size and shape, such as a five gallon bucket. FIG. 3 illustrates a second repository 30 received and retained utilizing the retention slots 14.

In one or more preferred methodologies of use, the apparatus 10 is mounted to the first repository 20 by placing the apparatus 10 over the first repository 20 such that a top surface of each mounting slot supports the apparatus 10 on the rim 22 of the first repository 20 and the walls of the mounting slot stabilize the apparatus 10 via abutment with inner and outer sidewalls of the first repository 20. Next, the second repository 30 containing contents for transfer to the first repository 30 is mounted on the apparatus 10 by positioning the second repository 30 such that the rim 32 of the second repository 30 is received and retained within the retention slots 14 of the apparatus 10, and such that a sidewall of the second repository 30 is supported by the curved support surface 16 of the apparatus 10.

For example, in an exemplary use case related to beekeeping, an apparatus is mounted to a first five gallon bucket, and then a second five gallon bucket containing honey is mounted to the apparatus such that the honey from the second five gallon bucket can flow into the first five gallon bucket.

Figure 4:
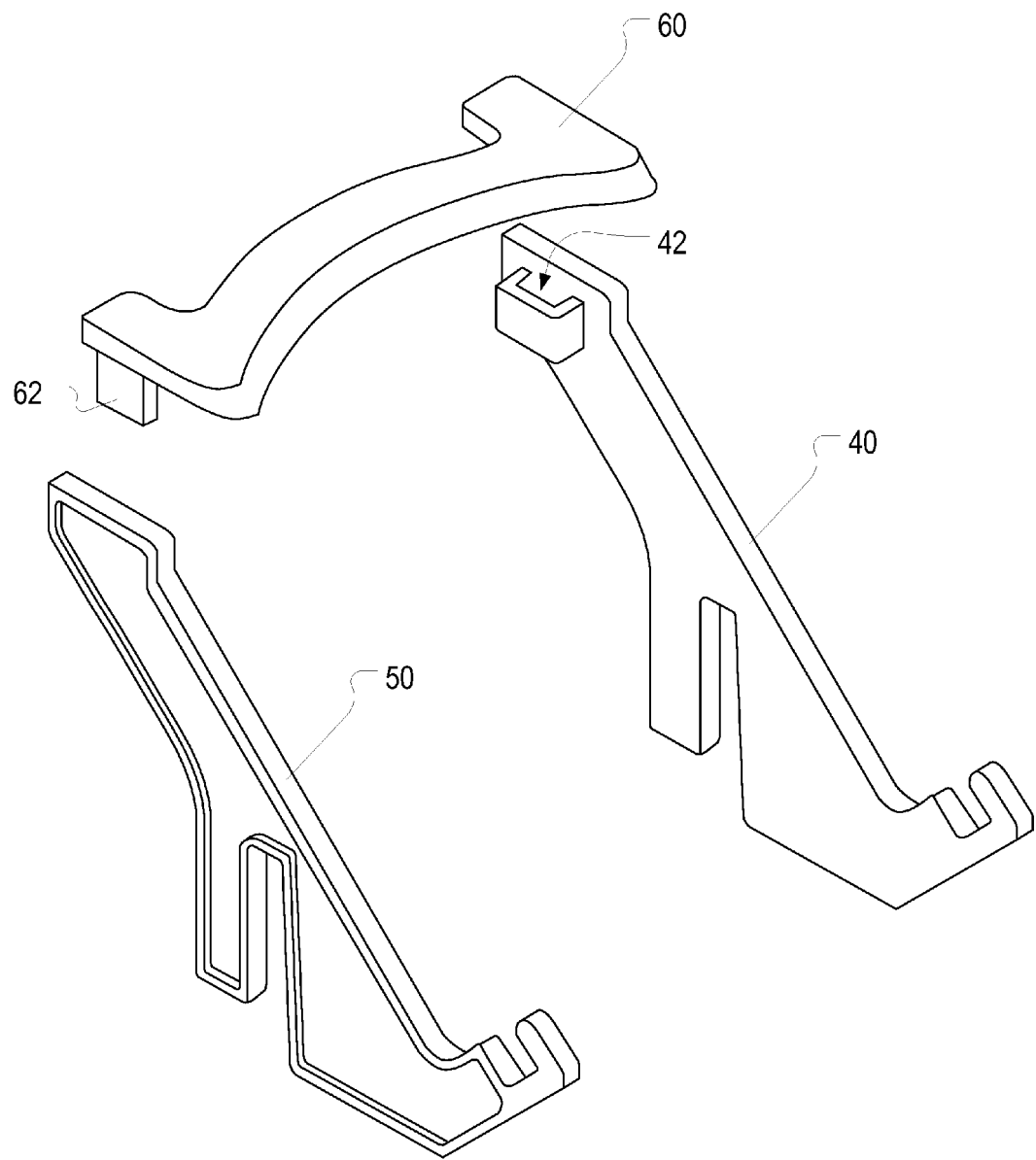
FIG. 4 illustrates component pieces of an exemplary implementation.
Figure 5:
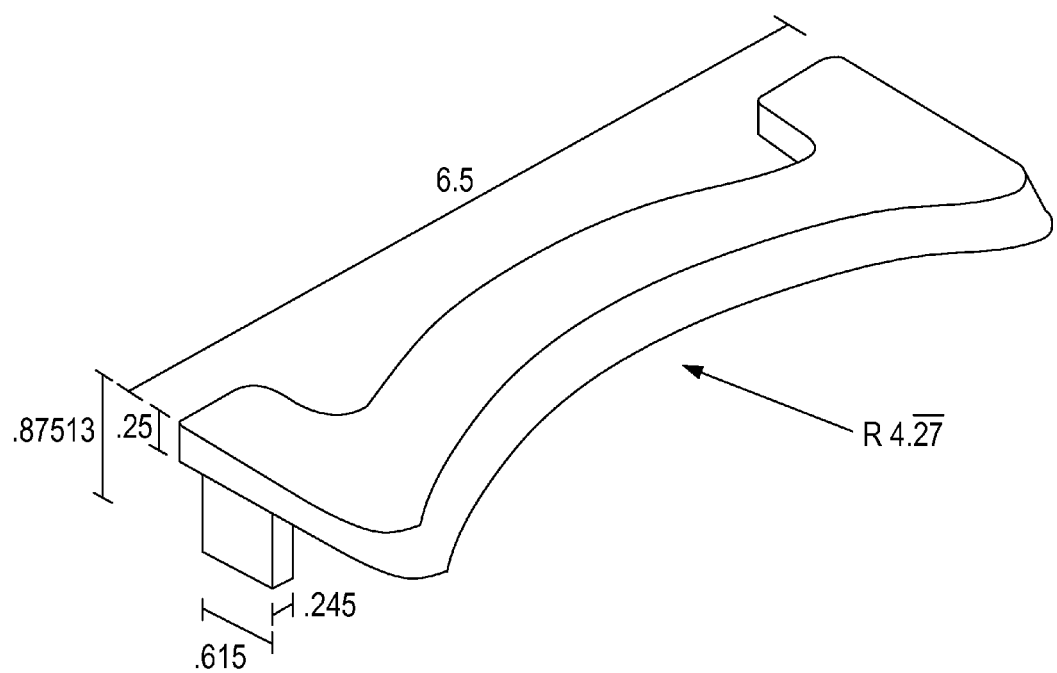
FIGS. 5-8 illustrate dimensions of the exemplary implementation of FIG. 4.
Figure 6:
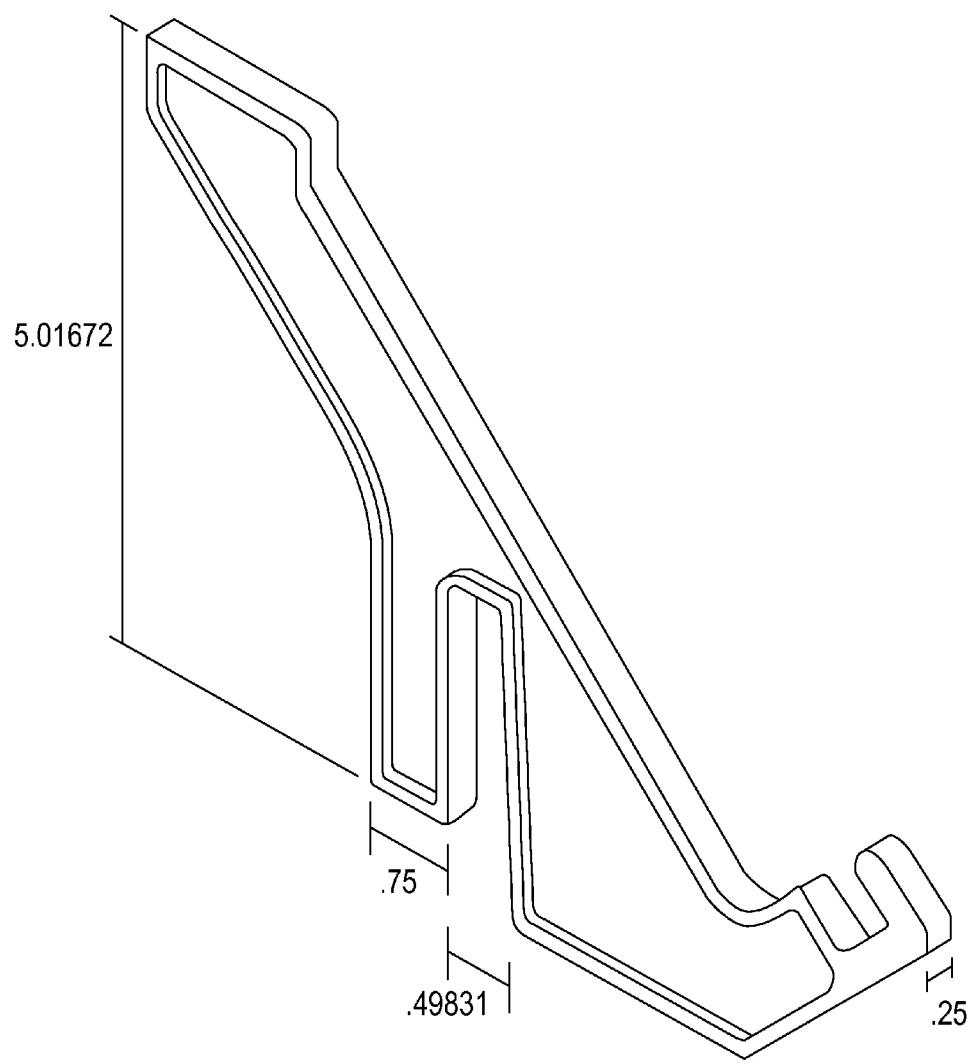
Figure 7:
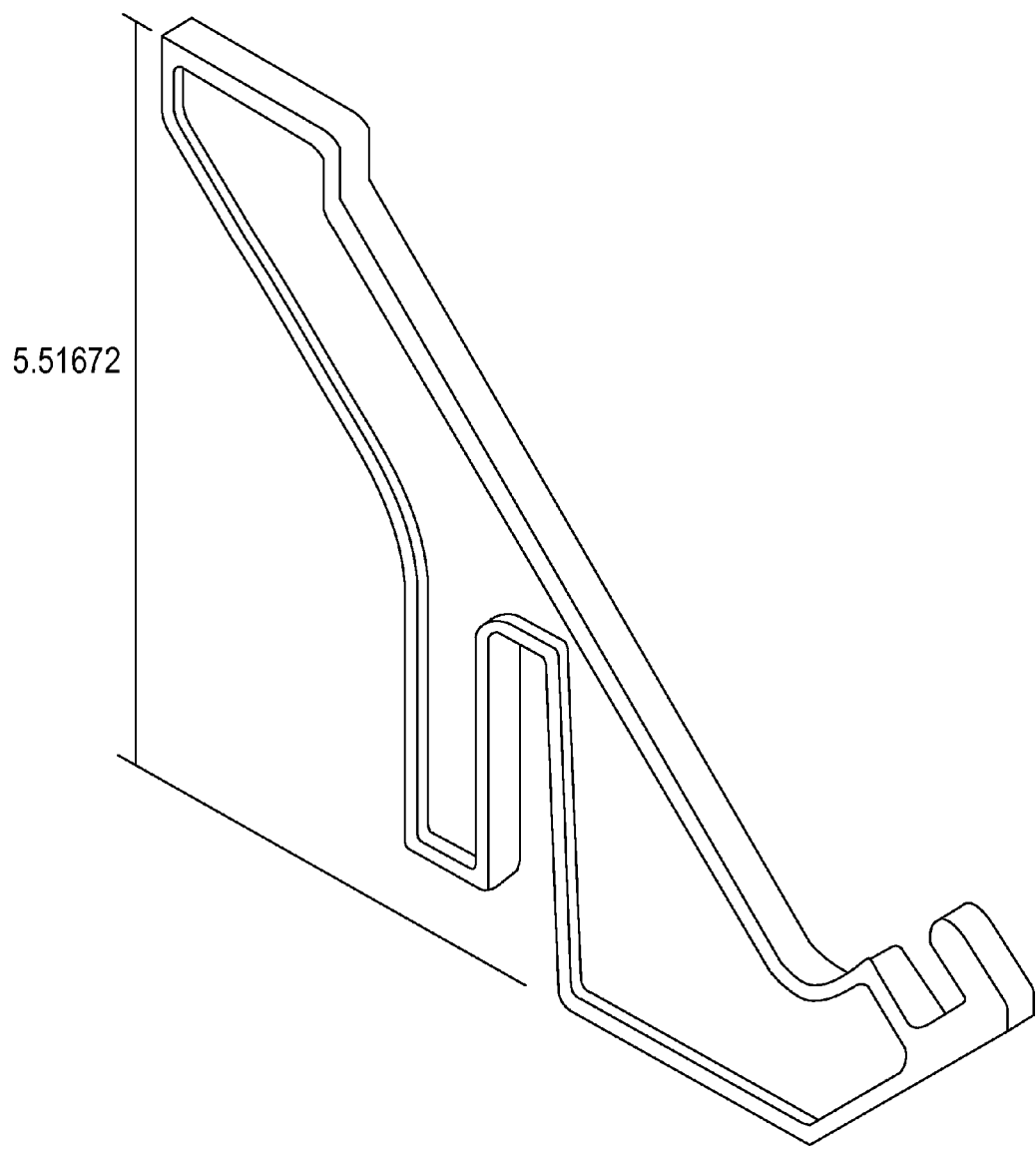
Figure 8:
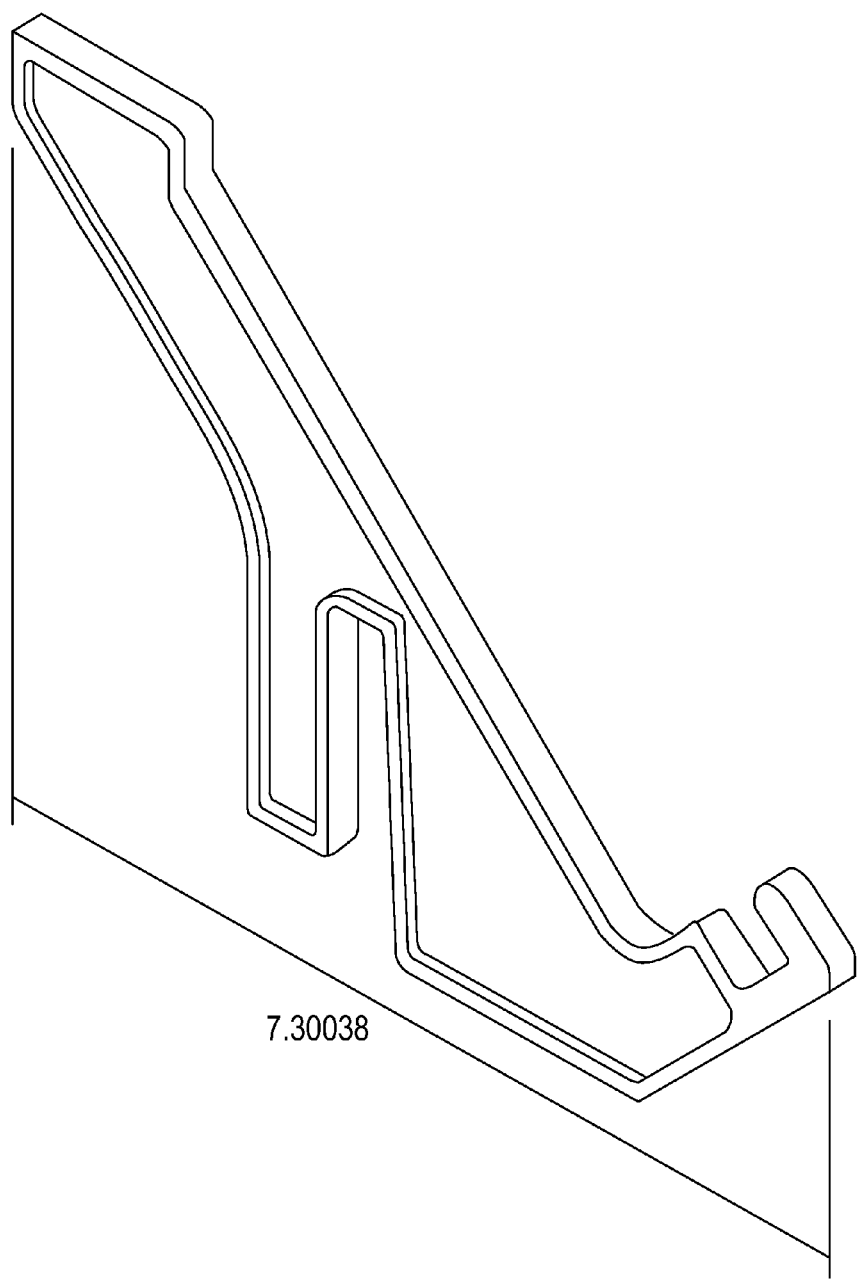

In one or more preferred implementations, an apparatus 10 comprises three pieces. These include a first side piece 40, a second side piece 50, and a top piece 60, as illustrated in FIG. 4. The top piece includes two insert portions 62, one disposed proximate a first lateral side of the top piece, and another disposed proximate a second, opposite lateral side of the top piece (the second insert portion is not illustrated in FIG. 4 owing to the angle of illustration). The first side piece 40 includes a receiving slot 42 configured to receive one of the insert portions 42. The second side piece similarly includes a receiving slot configured to receive one of the insert portions 42 (the receiving slot of the second side piece is not illustrated in FIG. 4 owing to the angle of illustration). The pieces 40,50,60 can be joined together by inserting the insert portions 62 of the top piece 60 into the receiving slots of the side pieces 40,50. In one or more preferred implementations, the pieces are secured to one another by glue, while in one or more other preferred implementations the pieces are not secured by glue and can be easily joined and disjoined.

In one or more preferred implementations, portions of some or all of the pieces are inset to minimize the material required to construct the pieces. For example, as illustrated in FIG. 4, the outer surface of the second side piece 50 is primarily inset compared to a protruding frame running along the outside of the outer surface. Preferably, the inner surface is not similarly inset. Preferably, the outer surface of the first side piece 40 is similarly inset (not illustrated), while the inner surface is not (as illustrated).

In one or more preferred implementations, the pieces 40,50,60 are formed of molded plastic.

FIGS. 5-8 illustrate dimensions of an exemplary apparatus for use with five gallon buckets. In one or more preferred implementations, an apparatus is sized and dimensioned for use with other size buckets, such as two, three and a half, or six gallon buckets.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A system comprising:
   (a) a first repository;
   (b) a second repository; and
   (c) an apparatus comprising
      (i) generally flat first and second side pieces mounted to the first repository, each side piece comprising
         (A) a mounting slot within which a sidewall of the first repository is disposed, an upper surface of the mounting slot supporting the respective side piece on a rim of the first repository with walls of the respective piece engaging the sidewall of the first repository and stabilizing the respective piece,
         (B) a retention slot within which a rim of the second repository is received and retained, the retention slot having a lesser depth than the mounting slot, and
         (C) a receiving slot,
         (D) wherein the entire retention slot is disposed vertically below a top of the receiving slot, and
      (ii) a generally flat top piece removably secured to the first and second side pieces in a manner which allows the pieces to be easily joined and disjoined, the top piece comprising
         (A) a first insert portion disposed proximate a first lateral side, the first insert portion being received within the receiving slot of the first side piece,
         (B) a second insert portion disposed proximate a second lateral side opposite the first lateral side, the second insert portion being received within the receiving slot of the second side piece, and
         (C) a curved support surface engaging a sidewall of the second repository and supporting the second repository such that it is oriented to allow contents of the second repository to empty into the first repository;
      (iii) wherein the first and second side pieces are oriented generally parallel to one another with a first distance between the mounting slots being the same as a second distance between the receiving slots.

2. The system of claim 1, wherein the first repository comprises a five gallon bucket.

3. The system of claim 1, wherein the second repository comprises a five gallon bucket.

4. The system of claim 1, wherein the second repository contains a viscous material.

5. The system of claim 1, wherein the second repository contains honey.

6. The system of claim 1, wherein the first and second side pieces and the top piece comprise molded plastic.

7. The system of claim 1, wherein the first and second side pieces and the top piece comprise metal.

8. The system of claim 1, wherein the curved support surface is curved to correspond to a sidewall of the second repository.

9. An apparatus comprising:
(a) generally flat first and second side pieces, each side piece comprising
  (i) a mounting slot sized and dimensioned to mount the respective piece to a repository,
  (ii) a retention slot sized and dimensioned for receipt of a rim of a repository, the retention slot having a lesser depth than the mounting slot, and
  (iii) a receiving slot; and
(b) a generally flat top piece removably secured to the first and second side pieces in a manner which allows the pieces to be easily joined and disjoined, the top piece comprising
  (i) a first insert portion disposed proximate a first lateral side, the first insert portion being received within the receiving slot of the first side piece,
  (ii) a second insert portion disposed proximate a second lateral side opposite the first lateral side, the second insert portion being received within the receiving slot of the second side piece, and
  (iii) a curved support surface configured to engage a sidewall of a repository;
(c) wherein the first and second side pieces are oriented generally parallel to one another with a first distance between the mounting slots being the same as a second distance between the receiving slots;
(d) wherein, when the apparatus is oriented to be mounted on a repository with a bottom of such repository flat on a level surface, the entire retention slot is disposed vertically below a top of the receiving slot.

10. The apparatus of claim 9, wherein the apparatus comprises molded plastic.

11. The apparatus of claim 9, wherein the apparatus comprises metal.

12. A method comprising:
(a) providing an apparatus comprising
  (i) generally flat first and second side pieces, each side piece comprising
    (A) a mounting slot sized and dimensioned to mount the respective piece to a repository,
    (B) a retention slot sized and dimensioned for receipt of a rim of a repository, the retention slot having a lesser depth than the mounting slot, and
    (C) a receiving slot; and
  (ii) a generally flat top piece removably secured to the first and second side pieces in a manner which allows the pieces to be easily joined and disjoined, the top piece comprising
    (A) a first insert portion disposed proximate a first lateral side, the first insert portion being received within the receiving slot of the first side piece,
    (B) a second insert portion disposed proximate a second lateral side opposite the first lateral side, the second insert portion being received within the receiving slot of the second side piece, and
    (C) a curved support surface configured to engage a sidewall of a repository;
  (iii) wherein the first and second side pieces are oriented generally parallel to one another with a first distance between the mounting slots being the same as a second distance between the receiving slots; and
  (iv) wherein, when the apparatus is oriented to be mounted on a repository with a bottom of such repository flat on a level surface, the entire retention slot is disposed vertically below a top of the receiving slot;
(b) mounting the apparatus on a first repository by positioning the apparatus such that the two opposed mounting slots of the apparatus each receive and retain a sidewall of the first repository, an upper surface of each mounting slot supporting the apparatus on a rim of the first repository and walls of each mounting slot engaging the sidewall of the first repository so as to stabilize the apparatus; and
(c) mounting a second repository containing contents on the apparatus by positioning the second repository such that a rim of the second repository is received within each of the two opposed receiving slots of the apparatus and a sidewall of the second repository is supported on a curved support surface of the apparatus, a front wall of each receiving slot and the curved support surface collectively retaining the second repository in an orientation such that the contents of the second repository empty into the first repository.

13. The method of claim 12, wherein the first and second repositories comprise five gallon buckets.

14. The method of claim 12, wherein the contents of the second repository that empty into the first repository comprise honey.

* * * * *